United States Patent
Komatsu (10) Patent No.: US 10,115,186 B2
(45) Date of Patent: Oct. 30, 2018

(54) IMAGE PROCESSING APPARATUS, IMAGING APPARATUS, DEPTH MEASURING APPARATUS AND IMAGE PROCESSING METHOD

(71) Applicant: CANON KABUSHIKI KAISHA, Tokyo (JP)

(72) Inventor: Satoru Komatsu, Mansfield Center, CT (US)

(73) Assignee: CANON KABUSHIKI KAISHA, Tokyo (JP)

(*) Notice: Subject to any disclaimer, the term of this patent is extended or adjusted under 35 U.S.C. 154(b) by 309 days.

(21) Appl. No.: 15/017,161

(22) Filed: Feb. 5, 2016

(65) Prior Publication Data
US 2016/0239977 A1  Aug. 18, 2016

(30) Foreign Application Priority Data
Feb. 18, 2015 (JP) ................................. 2015-029882

(51) Int. Cl.
| G06T 5/50 | (2006.01) |
| G06T 5/00 | (2006.01) |
| G06T 7/11 | (2017.01) |
| G06T 7/174 | (2017.01) |

(52) U.S. Cl.
CPC ............ *G06T 5/50* (2013.01); *G06T 5/006* (2013.01); *G06T 7/11* (2017.01); *G06T 7/174* (2017.01); *G06T 2207/10024* (2013.01); *G06T 2207/10028* (2013.01)

(58) Field of Classification Search
CPC ... G06T 5/50; G06T 7/174; G06T 7/11; G06T 5/006; G06T 2207/10028; G06T 2207/10024
USPC .......................................................... 382/103
See application file for complete search history.

(56) References Cited

U.S. PATENT DOCUMENTS

| 7,583,403 | B2 | 9/2009 | Ito et al. ........................ 358/1.9 |
| 2005/0147298 | A1* | 7/2005 | Gallagher .......... G06K 9/00664 382/173 |
| 2006/0013478 | A1* | 1/2006 | Ito ............................ H04N 1/62 382/167 |
| 2013/0287292 | A1* | 10/2013 | Ono ................... G06K 9/00201 382/154 |

FOREIGN PATENT DOCUMENTS

| JP | 4040625 B2 | 1/2008 |
| JP | 2013-182330 | 9/2013 |

* cited by examiner

*Primary Examiner* — Amandeep Saini
(74) *Attorney, Agent, or Firm* — Fitzpatrick, Cella, Harper & Scinto (57) ABSTRACT

Provided is an image processing apparatus for detecting a sky region based on a color image and a depth image, having: a first generator configured to generate a first provisional sky map based on pixel values of the color image; and an integrator configured to generate a sky map based on the first provisional sky map and depth values of the depth image.

16 Claims, 10 Drawing Sheets

- SKY MAP SHAPE CORRECTION PROCESSING
- TEXTURE MAP GENERATION — S24-1
- TEXTURE MAP LABELING PROCESSING — S24-2
- LABEL SELECTION — S24-3
- OVERLAP AMOUNT DETERMINATION — S24-4
- END DETERMINATION — S24-5
- END

FIG. 10A  SKY MAP GENERATION PROCESSING
S31 GENERATE SKY MAP FROM COLOR IMAGE
S32 GENERATE SKY MAP FROM DEPTH IMAGE
S33 GENERATE SKY MAP FROM IMAGING APPARATUS INFORMATION
S34 INTEGRATE SKY MAPS
S35 CORRECT SHAPE OF SKY MAP
END

IMAGE PROCESSING APPARATUS, IMAGING APPARATUS, DEPTH MEASURING APPARATUS AND IMAGE PROCESSING METHOD

BACKGROUND OF THE INVENTION

Field of the Invention

The present invention relates to an image processing apparatus, and more particularly to a technique to extract a sky region using a depth image and a color image.

Description of the Related Art

To reproduce memory colors in an imaging apparatus or an image processing apparatus, techniques to extract sky, human skin, the green of trees or the like as a region of interest, has been proposed. In these techniques, the region is normally determined using hue, chroma and brightness.

In recent years, an imaging apparatus configured to acquire a depth image at the same time with acquiring a color image is widely used, and an object extraction method using the depth image has been proposed. Various methods to measure depth have been proposed, such as an active method represented by a time of flight (TOF) method, and a passive method, such as a stereo method and a depth from defocus (DFD) method. In any of these methods, the range where depth can be measured is limited, so it is difficult to detect a sky region and measure the shape thereof correctly and at high resolution.

As a consequence, accurately extracting a sky region is important not only for reproducing memory colors of a color image, but also for correcting the depth of the depth image.

In Japanese Patent No. 4040625 (PTL1), in order to prevent correction of a memory color which should not be corrected, the correction intensity is changed depending on the color even if the color has the same correction target hue, so as to make the correction look visually natural. Further, whether a sky is included in the image or not is determined using the hue in the image and the photographing conditions, so that a region other than the sky will not be corrected by mistake.

In Japanese Patent Application Laid-Open No. 2013-182330 (PTL2), pixels existing in a specific depth range are selected using the depth information for extracting an object, and the object region is determined by calculating the degree of interest based on the degree of change of the pixels.

PTL1: Japanese Patent No. 4040625
PTL2: Japanese Patent Application Laid-Open No. 2013-182330

SUMMARY OF THE INVENTION

According to the sky region extraction method disclosed in PTL1, the screen is divided into large blocks, an average hue in each block is determined, and whether a block is a sky region or not is determined depending on whether the average hue of the block is included in a predetermined hue range as the sky region. This method is effective to determine whether the sky is included in the image, but the shape of the sky cannot be accurately extracted since the presence of the sky is determined in large block units.

Furthermore, all the colors included in the hue that is set as the sky region in advance are acquired as the sky region, and such an image processing as memory color correction is executed for these colors, hence the processing may be executed for a non-sky region that has a color similar to the sky region.

In PTL2, an object extraction method using a depth image is disclosed. This method is effective if the precision of the depth image is high, but in the case of a region of which depth cannot be correctly measured and which includes an error, such as a sky region, an error is included when pixels existing in a specified depth range are selected. Moreover, edge processing is used to calculate the degree of interest, hence the degree of interest cannot be accurately calculated in a sky region which has few edges.

With the foregoing in view, it is an object of the present invention to provide an image processing technique for extracting a sky region accurately at high resolution.

To solve the above problems, an image processing apparatus according to the present invention is an image processing apparatus for detecting a sky region based on a color image and a depth image, having: a first generator configured to generate a first provisional sky map based on pixel values of the color image; and an integrator configured to generate a sky map based on the first provisional sky map and depth values of the depth image.

An image processing method according to the present invention is an image processing method for detecting a sky region based on a color image and a depth image, having: a first generation step of generating a first provisional sky map based on pixel values of the color image; and an integration step of generating a sky map based on the first provisional sky map and depth values of the depth image.

According to the image processing apparatus of the present invention, a sky region can be accurately extracted at high resolution.

Further features of the present invention will become apparent from the following description of exemplary embodiments with reference to the attached drawings.

DESCRIPTION OF THE EMBODIMENTS (Embodiment 1)
<System Configuration>

Figure 1A:
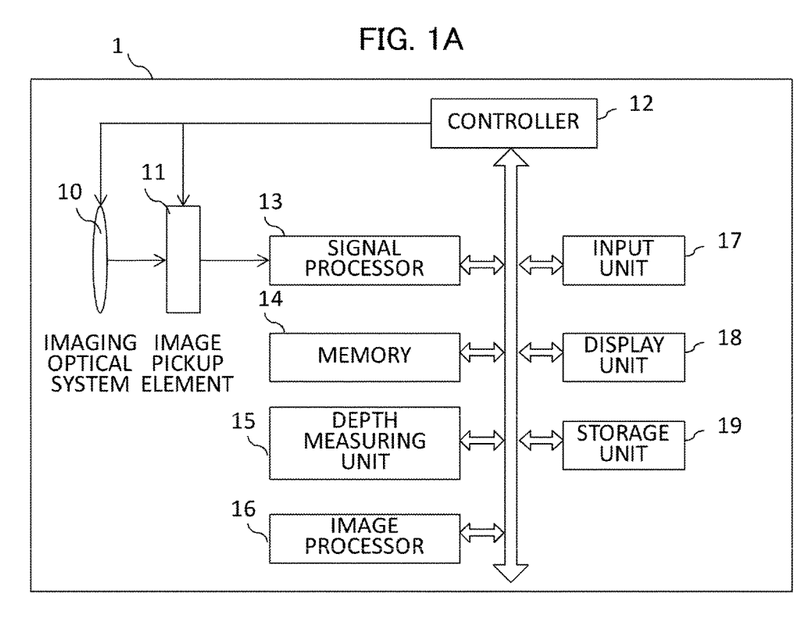
FIG. 1A and FIG. 1B are diagrams depicting configurations of an imaging apparatus according to Embodiment 1.

FIG. 1A is a system block diagram of an imaging apparatus including an image processing apparatus according to Embodiment 1 of the present invention. As shown in FIG. 1A, the imaging apparatus 1 has an imaging optical system 10, an image pickup element 11, a controller 12, a signal processor 13, a memory 14, a depth measuring unit 15, an image processor 16, an input unit 17, a display unit 18 and a storage unit 19.

The imaging optical system 10 is an optical system constituted by a plurality of lenses, and is configured to form an image of an incident light on an image plane of the image pickup element 11. For the imaging optical system 10, a vari-focal optical system is used, and automatic focusing is possible using an autofocus function of the controller 12.

The image pickup element 11 is an image pickup element having an image sensor, such as a CCD and CMOS, and acquires a color image. The image pickup element 11 may be an image pickup element including a color filter, or may be a three-color-plate type image pickup element. The image pickup element 11 may acquire a color image having more than three colors, including light other than visible light.

The controller 12 is a functional unit that controls each component of the imaging apparatus 1. The functions of the controller 12 are, for example, automatic focusing using an autofocus (AF) system, changing the focus position, changing the F value (diaphragm), loading an image, controlling a shutter and flash (neither illustrated), and controlling the input unit 17, the display unit 18 and the storage unit 19.

The signal processor 13 is a functional unit that performs processing for signals outputted from the image pickup element 11. The signal processor 13 may be implemented by a logic circuit, such as an ASIC, or may be implemented by software executed by a microprocessor or an FPGA. In concrete terms, the signal processor 13 performs such functions as the A/D conversion of an analog signal, noise cancellation, demosaicing, brightness signal conversion, aberration correction, white balance adjustment and color correction. Digital image data outputted from the signal processor 13 is temporarily stored in the memory 14, and is then displayed on the display unit 18, recorded (stored) in the storage unit 19, or outputted to the depth measuring unit 15, thereafter desired processing is performed.

The depth measuring unit 15 is a functional unit that acquires a distance in the depth direction to an object in the image. Details on the depth measurement operation will be described later. The depth measuring unit 15 may be implemented by a logic circuit, such as an ASIC, or may be implemented by software executed by a microprocessor or an FPGA.

The image processor 16 extracts a sky region from the photographed color image and the depth image. The extracted sky region can be used in various ways, such as for memory color correction and exposure control. The depth image can also be corrected using the extracted sky region.

The input unit 17 is an interface which the user operates for inputting information to the imaging apparatus 1 or changing settings thereof. For example, a dial, a button, a switch or a touch panel can be used as the input unit 17.

The display unit 18 is a display unit constituted by a liquid crystal display, an organic EL display or the like. The display unit 18 is used, for example, for checking the composition to photograph an image, viewing photographed or recorded images, or displaying various setting screens and message information.

The storage unit 19 is a non-volatile storage medium where the photographed image data, parameter data used for the imaging apparatus 1 and the like are stored. For the storage unit 19, it is preferable to use a large capacity storage medium where data can be read and written at high-speed. For example, a flash memory can be suitably used.

<Depth Measurement Method>

Figure 2A:
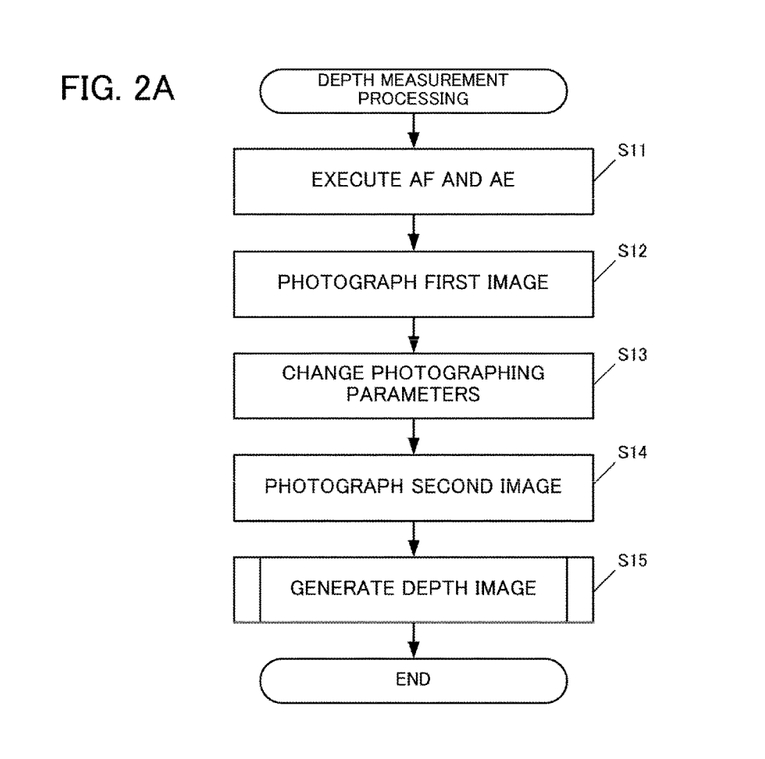
FIG. 2A is a flow chart depicting a depth measurement processing.

Now the depth measurement processing preformed by the imaging apparatus 1 will be described in detail with reference to FIG. 2A, which is a flow chart depicting the general flow of the processing. Here a depth measurement method, in the case of using the DFD method, will be described.

When the user operates the input unit 17 to instruct the execution of depth measurement and start photography, autofocus (AF) and automatic exposure control (AE) are executed first, then the photographing step is started, where the focus position and the diaphragm (F number) are determined (step S11). Then in step S12, photographing is executed and the image is loaded from the image pickup element 11.

When photographing the first image completes, the controller 12 changes the photographing parameters (step S13). The photographing parameters to be changed are at least one of: the diaphragm (F number), the focus position and the focal length. The new parameters may be acquired by reading a stored value, or may be determined based on the information inputted by the user. When the photographing parameter change step completes, processing advances to step S14, and the second image is photographed.

In this embodiment, the second image is photographed after changing the focus position. For example, the first image is photographed with focusing on the main object, and the second image is photographed with changing the focus position so that the main object blurs.

When the two images are photographed, the photographed images are processed by the signal processor 13 respectively, so as to become brightness images suitable for depth measurement, and are temporarily stored in the memory 14. In concrete terms, development processing is performed, but at this time, edge enhancement processing or the like must be avoided so that blur is not changed by the signal processing. Signal processing, including edge enhancement processing, is performed on at least one of the photographed images, and the processed image is stored in the memory 14 as an ornamental image.

In step S15, the depth measuring unit (depth image acquirer) 15 acquires the depth image from the two brightness images for depth measurement stored in the memory 14. The depth image is data representing distribution of the object depths in the image. The object depth may be expressed as an absolute depth from the imaging apparatus to the object, or may be expressed as a relative depth from the focus position to the object. The object depth may be expressed as the object distance or may be expressed as the image distance. Further, a value that can be converted into depth, such as degree of blur and correlation amount, may be used as the object depth. The distribution of the acquired object depth is displayed on the display unit 18, and is stored in the storage unit 19.

Figure 2B:
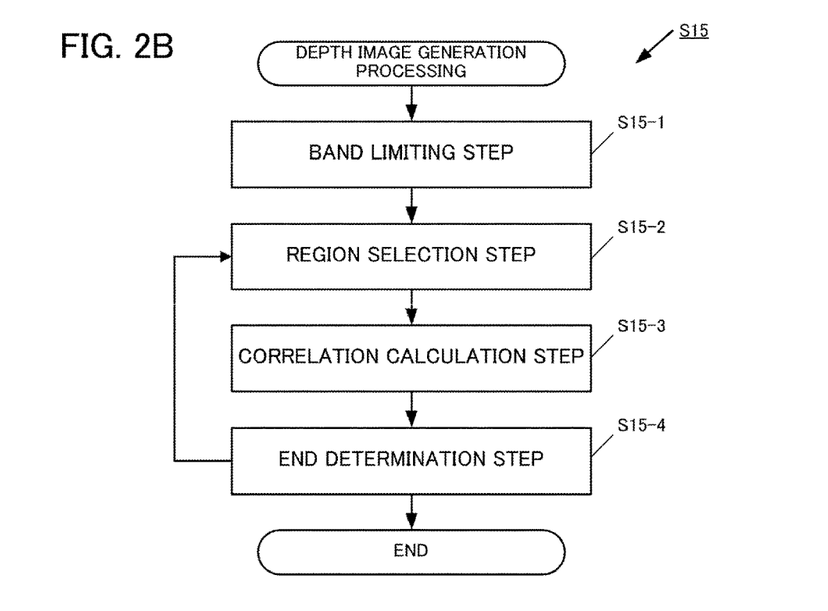
FIG. 2B is a flow chart depicting a depth image generation processing.

Now the processing executed by the depth measuring unit 15 in step S15 (hereafter called "depth image generation processing") will be described. FIG. 2B is a flow chart depicting the flow of the depth image generation processing S15 according to Embodiment 1.

When two brightness images having different focus positions are received, the depth measuring unit 15 executes filtering processing, so as to extract a desired spatial frequency band from the brightness images in a band limiting stop S15-1, and generates band-limited brightness images.

In a region selection step S15-2, the depth measuring unit 15 selects, in the two band-limited brightness images, target pixels having a same coordinate position and local region around the target pixel respectively. By shifting one pixel at a time, a target pixel and a local region around the target pixel are set for the entire image and the following processing is performed, then the depth image for the entire input image can be acquired. A number of pixels of the depth image is not always the same as a number of pixels of the input image, and a target pixel and the local region around the target pixel of the depth image may be acquired for every several pixels of the input image. The range of the local region may be predetermined for one or more regions, or may be specified by the user via the input unit 17.

Then in a correlation calculation step S15-3, the depth measuring unit 15 calculates the correlation between the local region of the first image and the local region of the second image selected in the region selection step S15-2 using Expression 1.

[Math. 1]

$$NCC_j = \frac{\sum (I_1 - \overline{I_1})(I_{2,i} - \overline{I_{2,i}})}{\sqrt{\sum (I_1 - \overline{I_1})^2 \sum (I_{2,i} - \overline{I_{2,i}})^2}} \quad (1)$$

where $NCC_j$ denotes a correlation value in a local region centering around the target pixel j, $I_{1,i}$ denotes a pixel value at a pixel position i in one image, and $I_{2,i}$ denotes a pixel value at a pixel position i in the other image. A total sum is determined for the local region centering around the target pixel j. $I_1$ or $I_2$ with an over bar refers to an average value of the pixel values in the local region in each image.

If there is no aberration and if a degree of blur when defocusing is the same in front and behind the focus position, the blur of the two images becomes the same in a medial position between the two focus positions at which the images are photographed, and correlation of the two images is highest at this position. Departing from this medial position, the degrees of blur of the two images become different, and correlation begins to drop. In other words, the peak of correlation of the two images is the position where the degrees of blur are the same, and correlation drops as the position departs from this position forward or backward. The correlation value therefore is a value corresponding to the degree of blur caused by defocusing, which means that the defocus amount can be known if the correlation value is known, whereby a relative depth can be acquired.

When the correlation calculation step S15-3 ends, processing advances to the end determination step S15-4. In the end determination step S15-4, it is determined whether an unprocessed region exists, and the region selection step S15-2 and the correlation calculation step S15-3 are repeated until calculation ends for all the specified regions or for the entire region of the image.

An example of acquiring the correlation value as a value related to depth was described, but another method may be used as the DFD method. For example, the local image is converted into a frequency space, and the ratio between the two images is determined using the following Expression 2, whereby the change of the blur amount between the images can be acquired.

[Math. 2]

$$\frac{F\{I_2\}}{F\{I_1\}} = \frac{F\{PSF_2 \otimes s\}}{F\{PSF_1 \otimes s\}} = \frac{OTF_2 \cdot S}{OTF_1 \cdot S} = \frac{OTF_2}{OTF_1} = OTF_r \quad (2)$$

where s indicates an unblurred image, and S indicates an image when the image s is converted into the frequency space. PSF denotes a point spread function in each local image, and OTF denotes an optical transfer function. OTFr indicates a relative OTF between the two images, whereby the depth can be determined.

<Other Depth Image Computing Methods>

Figure 1B:
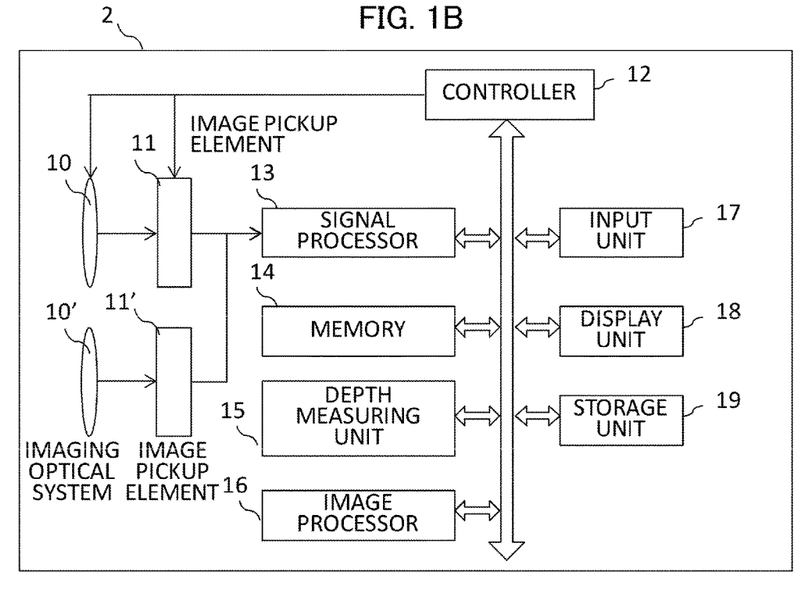

A DFD method was described as an example of a depth acquisition method, but the depth image computing method is not limited to the DFD method. A configuration based on a stereo method, where images having parallax are acquired using a plurality of imaging optical systems 10 and 10' and a plurality of image pickup elements 11 and 11', may be used, as shown in the imaging apparatus 2 in FIG. 1B. A pupil division stereo method, a time of flight (TOF) method or the like may also be used.

<Sky Map Generation Method>

Figure 3:
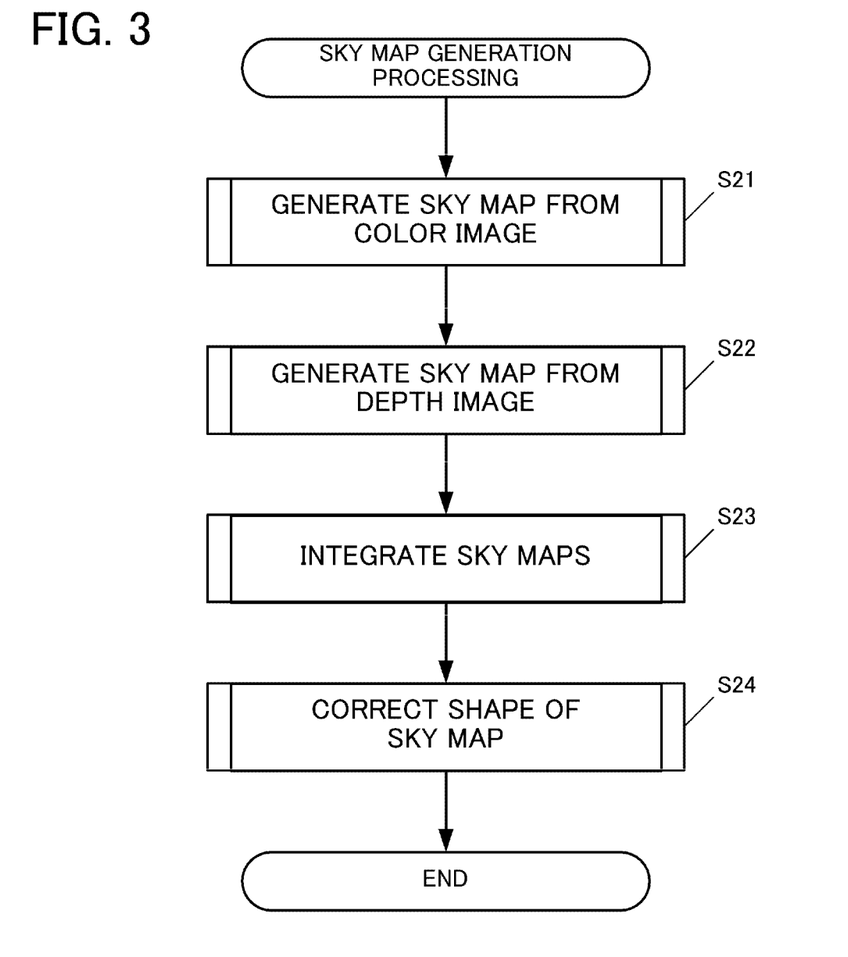
FIG. 3 is a flow chart depicting a sky map generation processing according to Embodiment 1.

The sky map generation processing performed by the image processor 16 will now be described in detail with reference to FIG. 3, which is a flow chart depicting the flow of the processing. The image processor 16 receives the depth image and the color image, and generates a sky map from these images. Now an example when the depth image and the color image are inputted after photographing the landscape shown in FIG. 4 will be described. The processing target depth image is the image generated in the depth image generation step S15, and the processing target color image is the color image focused on the main subject, out of the two color images used for generating the depth image.

[Sky Map Generation Processing Based on Color Image]

Figure 5A:
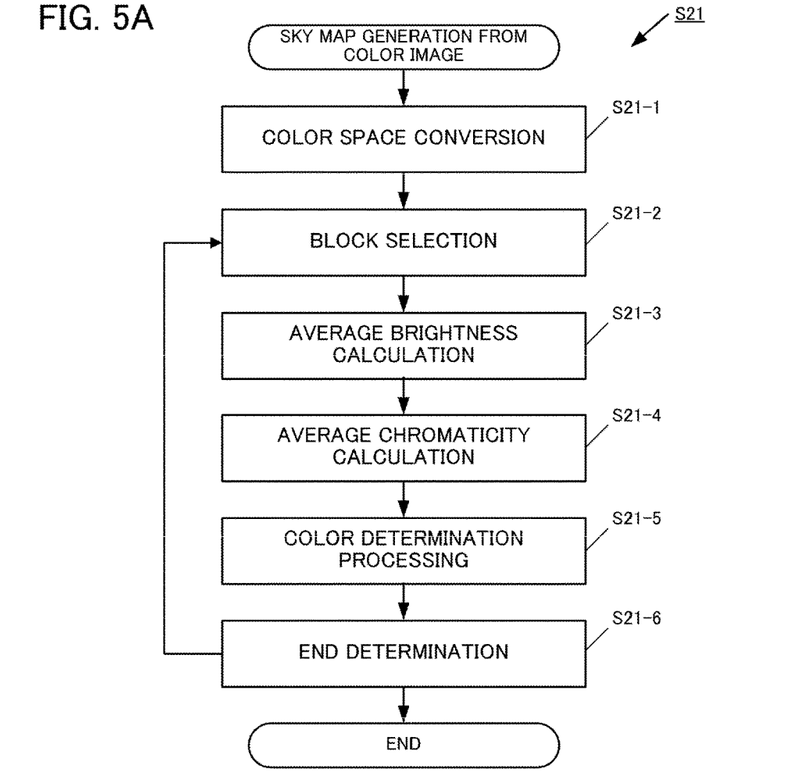
FIG. 5A is a flow chart depicting a color-based sky map generation processing according to Embodiment 1.

The processing of generating a sky map based on the pixel values of the color image (step S21) will be described with reference to the flow chart in FIG. 5A. The sky map generated based on the pixel values of the color image is hereafter called a "color-based sky map". The color-based sky map is data to specify a region having a high probability that this region is a sky region (candidate region of sky region) based on the pixel values of the color image. First the image processor 16 performs the color space conversion processing on the color image (step S21-1). For example, if the input color image is an RGB image, the RGB image is converted into a Lab isochromatic color space, whereby a Lab image is acquired. Then the image processor 16 divides the converted Lab image into a plurality of rectangular regions (block regions, first sub-regions), and executes the following processing for each divided block region (step S21-2). Here it is preferable that a block region has a size of which one side is several tens pixels, considering the stability of color determination. If a block region is selected, the image processor 16 computes an average brightness and average chromaticity in the block region. The average brightness of a certain region of interest can be determined as an average value of L components in the region (step S21-3). The average chromaticity is calculated by determining the average value of "a" components and the average value of "b" components respectively, and calculating the coordinates of the ab chromaticity plane(s) (step S21-4). Here the case of converting the RGB image into the Lab isochromatic color space was described as an example, but the present invention is not limited to this, and similar processing may be performed with converting the RGB image into another color space.

To determine whether the calculated average brightness and average chromaticity of the processing target block region, images under various photographing conditions, such as a blue sky, an evening sky, and a cloudy sky, are acquired in advance, and the brightness and chromaticity coordinates thereof are calculated so as to define the ranges of the sky in the color space. The information defined in advance is stored in the memory 14 or the storage unit 19.

The image processor 16 reads the ranges of the brightness and chromaticity of the sky region defined in advance, and determines whether the average brightness and average chromaticity calculated for the processing target block region are included in these ranges. If the calculated average brightness and average chromaticity are included in the ranges of the brightness and chromaticity of the sky region defined in advance, the image processor 16 determines that the processing target block region is a candidate of the sky region (step S21-5). In other words, the image processor 16 determines that a processing target block having a predetermined brightness and chromaticity is a candidate of the sky region.

Figure 5B:
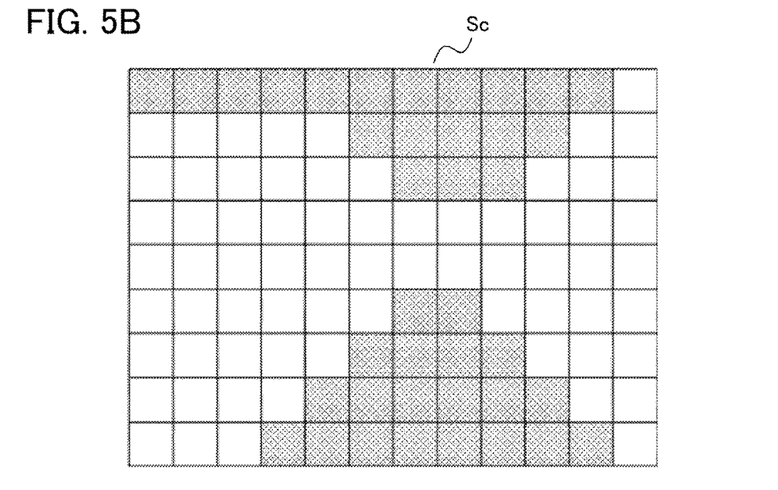
FIG. 5B is an example of the processing result.

The image processor 16 performs the end determination step in step S21-6 to determine whether the sky region determination is completed for all divided block regions. If the sky region determination is not completed, processing returns to step S21-2 and the same processing is repeated. Finally, the color-based sky map Sc, which is a binary map indicating whether each region is a sky region or not, is generated, as shown in FIG. 5B. In FIG. 5B, the hatched region indicates the sky region. In this example, the sky is generated as a binary map, but a multi-value map having different values, depending on whether the sky is a blue sky, evening sky or cloudy sky, may be generated.

In the color-based sky map Sc, it is indicated whether each rectangular region (one side has about several tens pixels) is a sky region or not, therefore the spatial resolution of the color-based sky map Sc is lower than that of the input image. Further, it is possible that the region of which color is close to the sky may be erroneously determined as a sky region. Furthermore, the color-based sky map Sc is generated by dividing the input image into rectangles and determining whether the region is a sky region or not based on the average brightness and average chromaticity of the rectangular region, therefore a non-detection may occur in a rectangular region where sky and non-sky regions are mixed at a similar ratio.

Here the input color image is converted into a Lab image, and whether the divided region is a sky region or not is determined based on the average brightness and the average chromaticity, but this is not essential. In the color determination processing S21-5, a sky region is determined as a region of which either brightness or hue in the color image is included in (corresponds to) the brightness or hue defined as the sky region in advance.

[Sky Map Generation Processing Based on Depth Image]

The sky map generation using a depth image (step S22) will now be described. A sky map generated based on the depth image is hereafter called a "depth-based sky map". The depth-based sky map is data to specify a region of which probability of being a sky region is high based on the depth values of the depth image (candidate region of sky region). First how a sky region is outputted in the depth image will be described.

The sky region is a region existing at infinity or at a depth regarded as infinity, outside the depth measurement range of the depth measuring apparatus, and when a depth is acquired, the depth of the sky region normally indicates an unstable value. For example, in the case of the DFD method, which is one passive type depth measurement method, a depth is acquired based on the difference of the blur between two images of which focus positions are different, but it is difficult to acquire correct depth of the sky region existing at a far distance since it is difficult to distinguish the difference of the blurs of the two images. Therefore if an object exists at a certain depth or more, the depth cannot be determined, and the acquired depth becomes a maximum measurable depth value or becomes unmeasurable.

In the case of depth measurement using the passive type stereo method, parallax cannot be generated in a sky region located at a far distance, that is, a depth exceeding a certain depth cannot be distinguished and becomes a maximum measurable depth value or becomes unmeasurable. Moreover, in a sky region, the contrast is low and two images having parallax cannot be matched correctly, so that a generated depth value fluctuates and is unstable.

In the case of the active method as well, a measurable depth is limited to a range reached by light, and a depth exceeding a certain depth cannot be measured, which results in presenting an unstable value. Moreover, if an object does not reflect irradiated light very much, this object cannot be distinguished from an object existing at a far distance.

Therefore, regardless of what depth measurement method is used, the depth of the sky region cannot be accurately measured, and output of the measurement result becomes outside the depth measurement range or at infinity in the depth image. Even if an actual depth value is acquired for the sky region, the sky region is still a region where the depth values are unstable (a region where the dispersion of depth values is large).

In other words, a region which indicates a depth outside the depth measurement range or at infinity and a region where dispersion of depth values is large is a region where depth measurement is not correctly performed and reliability is low in the depth image, and such a region has a high possibility of being a sky region.

In this embodiment, the image processor 16 extracts a sky region from the depth image by considering to the reliability of the depth image. The sky region processing S22, when a region having low reliability is acquired based on dispersion of depth values in a local region, will be described with reference to the flow chart in FIG. 6A.

Figure 6A:
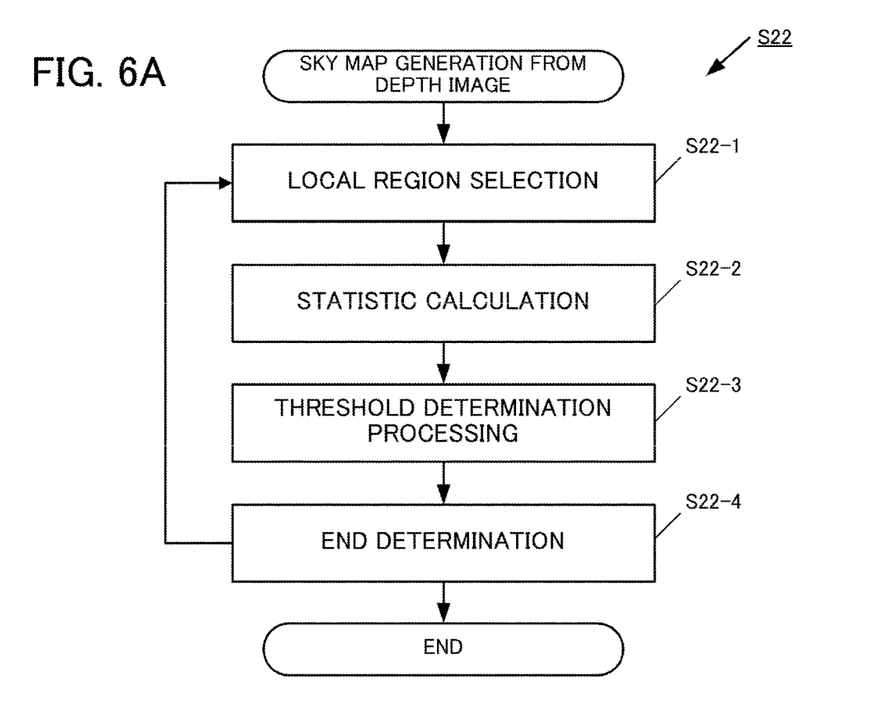
FIG. 6A is a flow chart depicting a depth-based sky map generation processing according to Embodiment 1.

Generally the depth does not drastically change for a same object. Therefore a region which has high dispersion of depth values includes either a depth measurement error which makes depth management unstable, such as a case of a sky region, or an object of which depth differences are large in a local region where dispersion is calculated. It can be determined that a region of which depth dispersion is more than a predetermined dispersion has a high possibility of being a sky region.

First the image processor 16 selects a local region of which dispersion is calculated (step S22-1). This local region is preferably a region which has a smaller surface area than a rectangular region (first sub-region) used for calculating the color-based sky map Sc, and of which one side is about several pixels.

Then the image processor 16 calculates, as a value representing a dispersion of depth values, a statistic such as variance or standard deviation in the local region (step S22-2). If the depth dispersion in a local region of the depth image is a threshold $Th_{vd}$ or more (first threshold or more), the image processor 16 determines that the pixel at the center of the local region is the sky region (step S22-3). The threshold $Th_{vd}$ here must be set to such a value that the depth dispersion generated by an error can be detected, since if the threshold $Th_{vd}$ is too small, the boundary of an object having a depth difference may also be determined as a sky region.

The above processing on the local region is sequentially performed with shifting the local region to be selected, and whether a region is a sky region or not is determined for all regions of the input image (step S22-4). The image processor 16 eventually generates a depth-based sky map Sd where a region is a sky region or not is expressed as binary data. Here whether the region is a sky region or not is determined for each pixel, but may be determined for each region constituted by a plurality of pixels (second sub-region). It is preferable that the size of the second sub-region is smaller than the block region used for the color-based sky map extraction (first sub-region). The example described here is a case when the second sub-region is constituted only by one pixel.

Figure 6B:
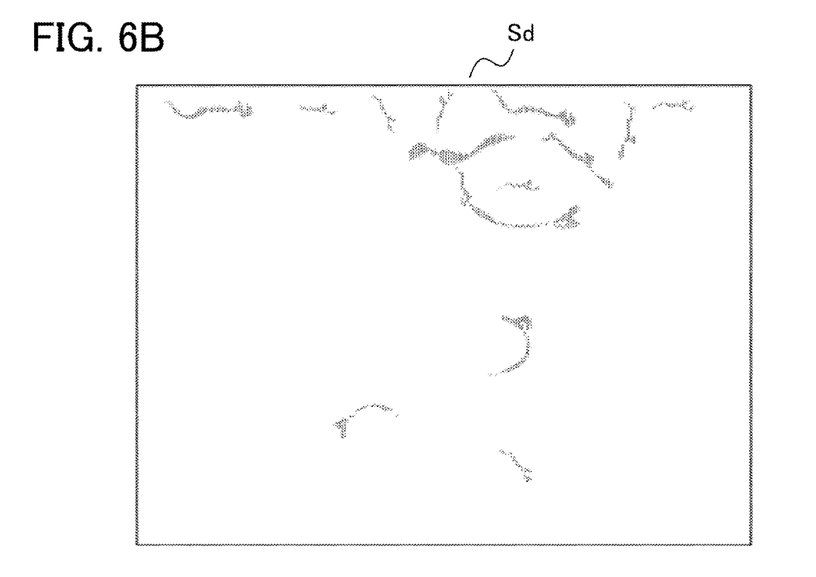
FIG. 6B is an example of the processing result.

The depth error in a sky region is not always generated in the entire sky region, but may be generated only in a part of the sky region. Therefore in the depth-based sky map Sd, only the part of the sky region where depth dispersion is large is selected, and the shape of the sky region cannot be accurately reproduced by extracting the sky region. FIG. 6B shows an example of the depth-based sky map Sd. In FIG. 6B, the hatched region is a part of the sky region where dispersion is large.

In this embodiment, a region where depth dispersion is large in the depth image is detected as a sky region, but as mentioned above, a region indicated as outside the depth measurement range or a region indicated as depth measurement impossible may be detected as a sky region. If the depth measurement apparatus outputs a value indicating infinity for such regions, the region indicated as infinity may be detected as a sky region.

[Sky map integration processing]

Figure 7A:
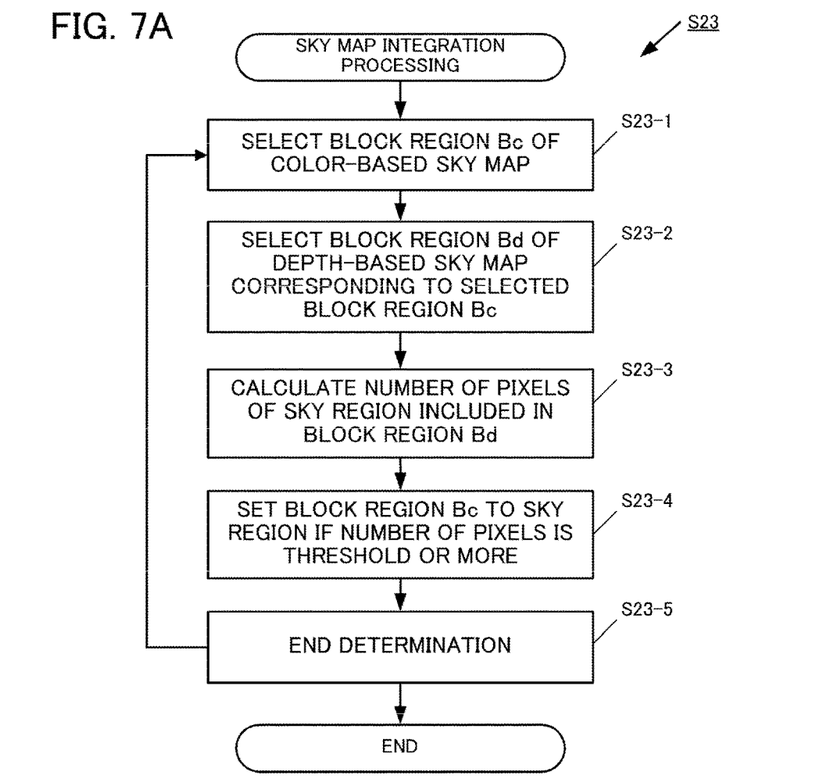
FIG. 7A is a flow chart depicting a sky map integration processing according to Embodiment 1.

Now integration processing S23, to integrate two sky maps (color-based sky map Sc and depth-based sky map Sd), will be described. As mentioned above, in the case of the color-based sky map Sc which uses colors, an object region having a color similar to the sky region may be erroneously detected as the sky region. In the case of the depth-based sky map Sd, on the other hand, not the color information but the depth dispersion, which is one indication of the reliability of depth, is used for calculation, however only part of the sky region may be detected. By regarding a sky region as a region which satisfies both the sky maps acquired based on the two types of indexes, a region which has high probability of being a sky region is extracted.

The sky map integration processing S23 will be described in detail with reference to the flow chart in FIG. 7A. As mentioned above, only a part of the sky region is detected in the depth-based sky map Sd, which means that only a part of the sky region is detected if a common portion of the two sky maps is extracted for each pixel. Therefore whether a region is a sky region or not is determined for each block region (first sub-region) in the color-based sky map Sc. First the image processor 16 selects a block region Bc in the color-based sky map Sc (step S23-1). Then the image processor 16 selects a block region Bd in the depth-based sky map Sd, which corresponds to the selected block region Bc in the color-based sky map Sc (step S23-2). Then the image processor 16 counts a number of pixels of a sky region included in the block region Bd (step S23-3). If a calculated number of pixels of the sky region is a threshold $Th_{Nd}$ or more, the image processor 16 sets the block region Bc selected in the color-based map Sc to a sky region (step S23-4). Here whether a region is a sky region or not is determined using a number of pixels of the sky region included in the block region Bd, but a block region Bc may be determined as a sky region when the ratio of the pixels of a sky region included in the block region Bd is a predetermined ratio or more. If the sizes of the block regions Bc in the color-based sky map Sc are all the same, technically it does not matter whether the number of pixels or the ratio is used to determine whether a region is a sky region. However, if the size of a block region Bc is not fixed, it is preferable that whether a region is a sky region or not is determined using the ratio of the pixels of a sky region included in the block region Bd.

Figure 7B:
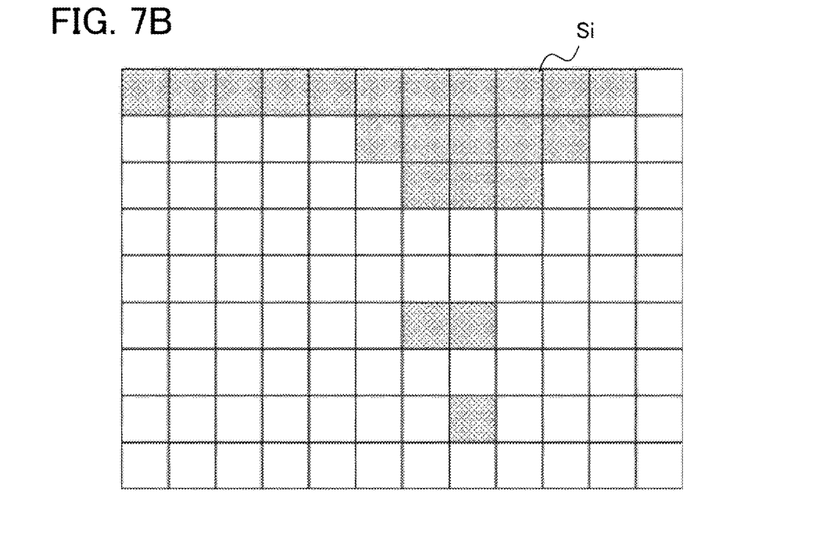
FIG. 7B is an example of the processing result.

The above processing is executed for all the block regions of the color-based sky map Sc (step S23-5). Thereby an integrated sky map Si, where regions that are common to the color-based sky map Sc and the depth-based sky map Sd are sky regions, can be generated at a similar spatial resolution as the color-based sky map Sc. FIG. 7B shows the integrated sky map Si acquired by integrating the color-based sky map Sc in FIG. 5B and the depth-based sky map Sd in FIG. 6B.

The method for the integration processing is not limited to the above method. Another method may be used if whether a region is a sky region or not is determined based on the overlap of the sky regions determined in the color-based sky map Sc and the sky regions determined in the depth-based color map Sd. For example, whether a region is a sky region or not may be determined based on a ratio or a number of pixels, which are determined as a sky region in both the color-based sky map Sc and the depth-based sky map Sd, in a predetermined region which is different from the block region (first sub-region) used for generating the color-based sky map Sc.

[Sky map correction processing]

By using the reliability of the depth image, robustness of the sky region detection can be improved even more than a regular sky region determination by a color image alone. However, the integrated sky map Si cannot accurately reproduce the shape of the sky region, since resolution is based on the size of the divided rectangular region in the color-based sky map Sc. Therefore the image processor 16 performs the shape correction processing for the sky region (step S24) next. The shape correction processing for the sky region will be described with reference to the flow chart in FIG. 8A.

Figure 8A:
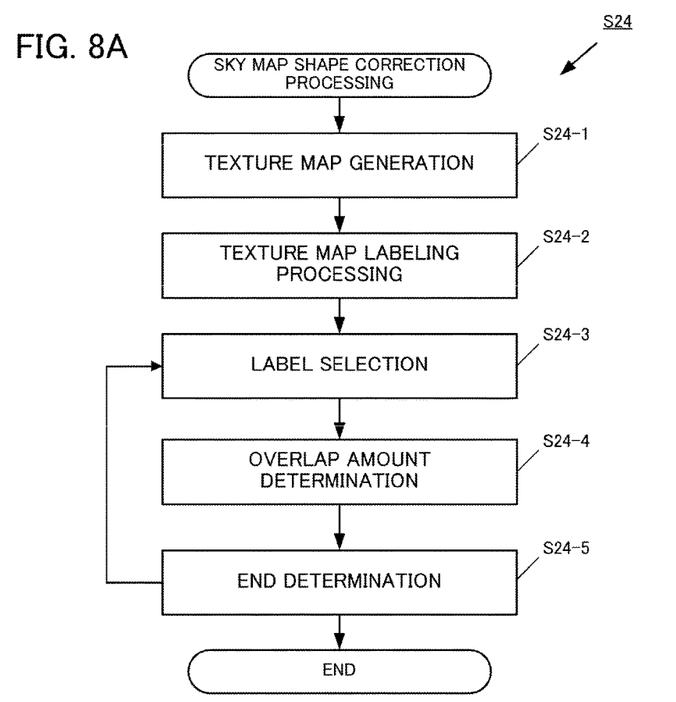
FIG. 8A is a flow chart depicting a sky map shape correction processing according to Embodiment 1.

First a binary texture map St is generated from the inputted color image by determining whether the texture amount is high or low (step S24-1). A sky region normally has a low texture amount, hence a sky region can be extracted by extracting the low texture region. The method of generating the texture map St is approximately the same as the processing of generating a sky map from the depth image (step S22). The difference is that an image to be inputted is not the depth image but a brightness image, and the statistic calculation method is different. The brightness image is acquired by converting the inputted color image. The statistic is preferably determined by calculating variance or standard deviation first, just like step S22-2, and then normalizing the determined variance or standard deviation using the average brightness, sensitivity and a coefficient in the local region so as to convert the difference of the noise amount generated by the difference of brightness. This is because dispersion caused by a light shot noise increases as the brightness in the region is higher, and dispersion caused by the texture must be detected after correcting the influence of the dispersion. It is preferable that the computing region is a narrow region, such as a 3×3 pixel region, whereby a high resolution texture map is generated in order to use this texture map for the shape correction processing of a sky region. The image processor 16 extracts a region of which normalized variance or standard deviation is a threshold $Th_{vt}$ or less (second threshold or less) as the low texture region. For the threshold, a value by which a sky region can be detected from various images, including various sky regions, is determined and set.

Figure 4:
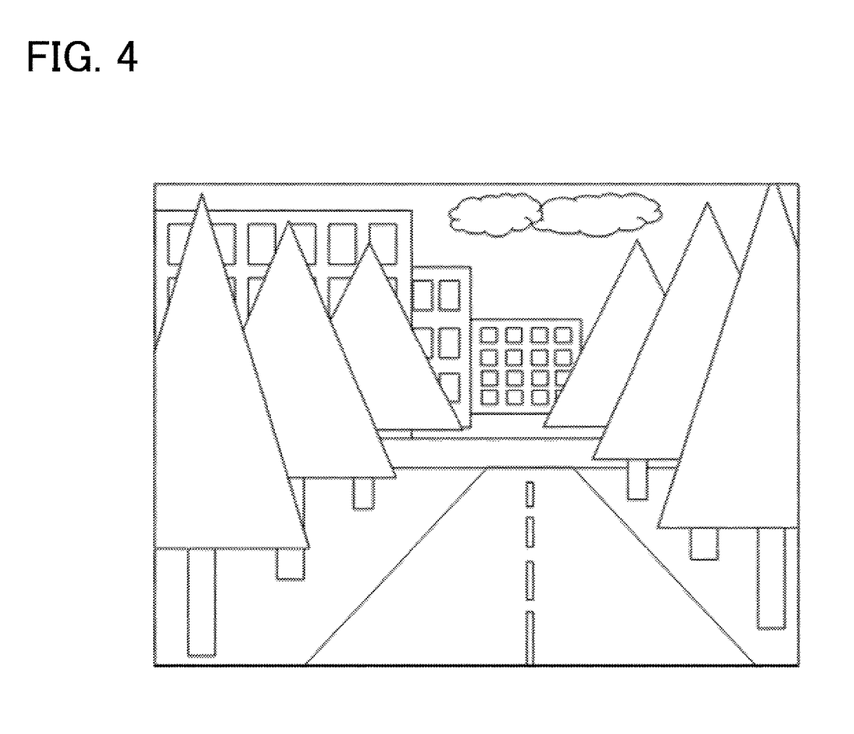
FIG. 4 shows an example of an input image.
Figure 8B:
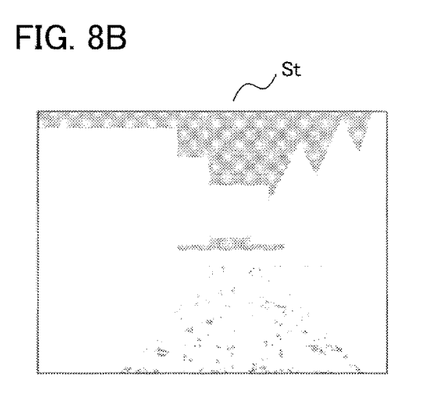
FIG. 8B and FIG. 8C are examples of the processing result.

FIG. 8B shows a texture map St. In FIG. 8B, the hatched region is a region where the texture amount is low. However as the comparison of FIG. 4 and FIG. 8B shows, a low texture region is not always a sky region. In the example of FIG. 8B, the road region is determined as the low texture region. Therefore, hereafter the image processor 16 corrects the sky map using both the texture map St and the integrated sky map Si.

Then the image processor 16 corrects the shape of the sky region in the integrated sky map Si using the integrated sky map si and the texture map St. In concrete terms, in the texture map St, the image processor 16 executes a labeling processing for assigning an individual label to each independent low texture region (connected low texture region) (S24-2). Then the image processor 16 performs label selection (step S24-3), and calculates the amount of overlap between the selected label region and the sky region in the integrated sky map Si (step S24-4). The amount of overlap can be calculated as a ratio of a number of pixels of the selected label region and a number of pixels of the sky region overlapping with the label region in the integrated sky map Si. The image processor 16 determines whether the amount of overlap is a threshold $Th_{Nt}$ or more (a third threshold or more), and determines that the selected label region is the sky region if the amount of overlap is the threshold $Th_{Nt}$ or more (step S24-4). The image processor 16 executes the above processing for all the labels (step S24-5). By this processing, the shape of a rectangular region, determined as a sky in the integrated sky map Si, can be corrected to a high resolution sky region using texture map St.

Figure 8C:
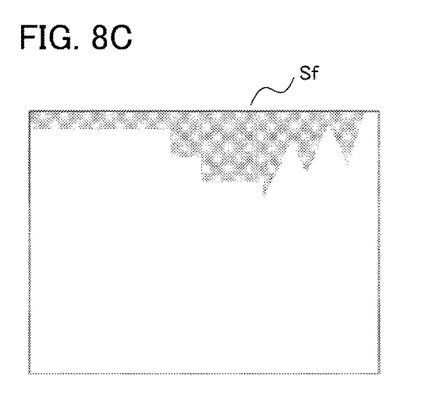

The image processor 16 outputs a final sky map Sf in which the sky region has been extracted at high resolution by the above processing. FIG. 8C shows an example of the corrected final sky map Sf. Compared with the integrated sky map Si, the sky region of the final sky map Sf is accurately reproduced at high resolution by considering the texture map St of the color image. Moreover, by considering the texture map St, the region which was erroneously determined as the sky region in the integrated sky map Si can be removed from the sky region.

The sky map Sf outputted by the image processor 16 is stored in the memory 14, and is used for other applications. For example, the sky map Sf is used for memory color correction processing for a photographed color image, or for exposure control processing based on a ratio for an image of the sky region. The sky map Sf can also be used for the depth image correction processing. In the depth image acquired by the depth measuring unit 15, the image processor 16 replaces the depth values of the region corresponding to the sky region with an infinity depth or a maximum measurable depth. Thereby the depth error generated during the depth measurement can be corrected.

<Advantageous Effect of this Embodiment>

According to this embodiment, by using different features values (the color information acquired from the color image, and the reliability information of the depth calculation acquired from the depth image), the robustness of the sky region detection can be improved, and the detection errors can be decreased. Furthermore, the shape of the sky can be extracted at high resolution from the extracted sky region, by using the high resolution texture map based on the brightness image generated from the color image.

Moreover, the depth image can be corrected by setting the sky region of the inputted depth image to infinity or to the maximum measurable value using the detected sky map.

(Embodiment 2)

Figure 9:
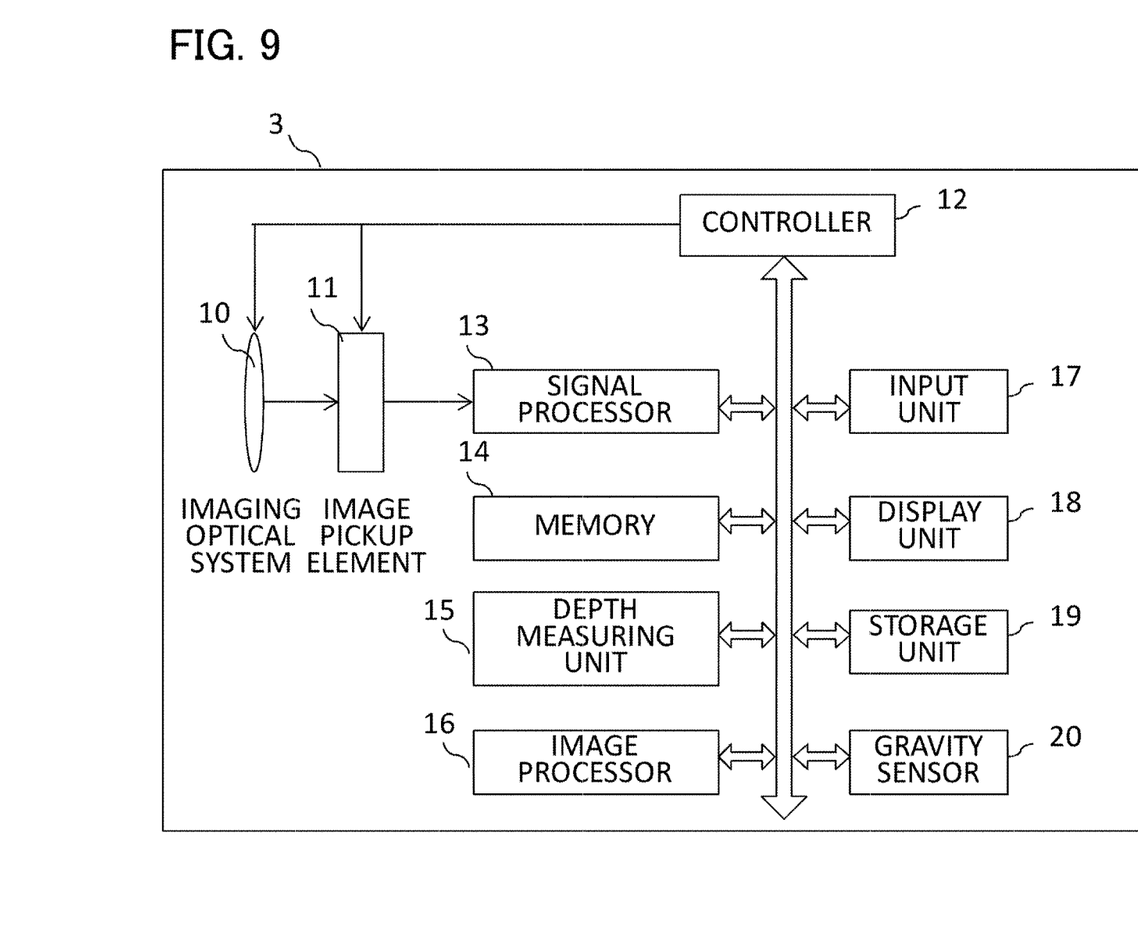
FIG. 9 is a diagram depicting a configuration of an imaging apparatus according to Embodiment 2.

Embodiment 2 of the present invention will now be described. A difference of Embodiment 2 from Embodiment 1 is that the attitude information or setting information of the imaging apparatus at photographing is used as additional information. FIG. 9 shows a configuration of an imaging apparatus 3 having an image processing apparatus of Embodiment 2. The imaging apparatus 3 includes a gravity sensor (triaxial acceleration sensor) 20, in addition to the configuration of the imaging apparatus 1 shown in FIG. 1A. However, the imaging apparatus according to this embodiment may have a configuration of the imaging apparatus 2 shown in FIG. 1B with the gravity sensor 20 added. For the gravity sensor 20, any conventional sensor can be used if the direction of gravity can be detected. The imaging apparatus 3 can detect the attitude (pitch angle, roll angle) of the imaging apparatus 3 based on the sensor information from the gravity sensor 20.

Figure 10A:
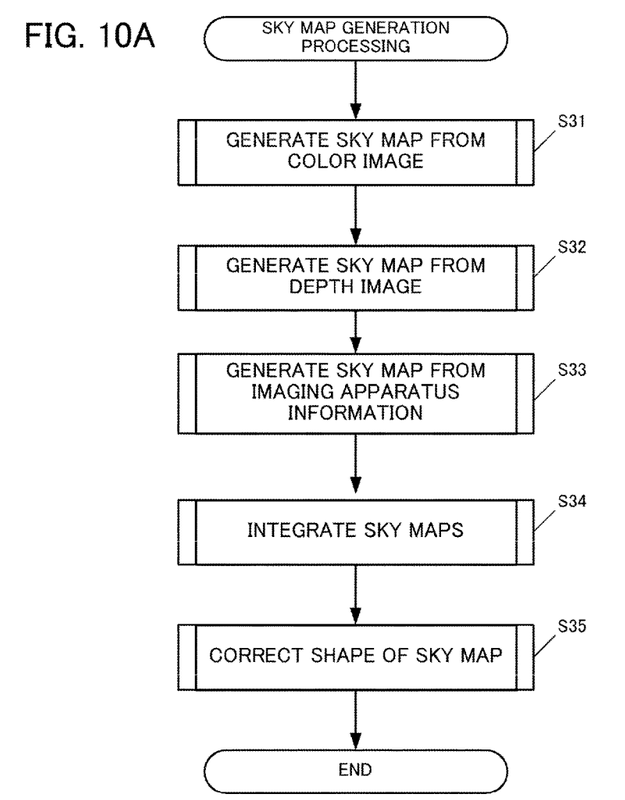
FIG. 10A to FIG. 10C are a flow chart and diagrams for explaining a sky map generation processing according to Embodiment 2.

A sky region detection processing performed by the image processor 16 will be described in detail with reference to FIG. 10A, which is a flow chart depicting the flow of the processing. The color-based sky map generated from the color image (step S31) and the depth-based sky map generated from the depth image (step S32) are the same as Embodiment 1 (steps S21 and S22 in FIG. 3).

Figure 10B:
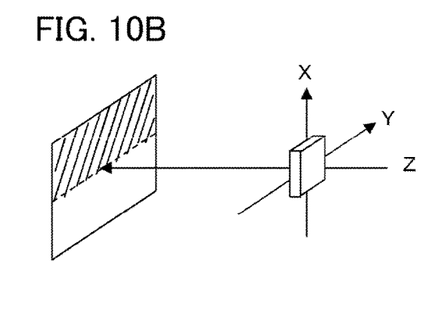
Figure 10C:
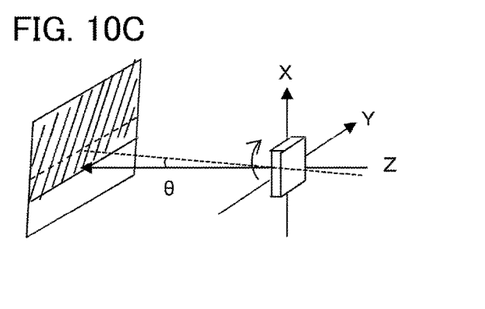

In the sky map generation based on the imaging apparatus information in step S33, the image processor 16 first determines how much the optical axis of the imaging apparatus 3 deviated from the horizon using the information of the gravity sensor 20. As shown in FIG. 10B and FIG. 10C, when the imaging apparatus 3 is installed horizontally with respect to the ground, the optical axis direction is taken as the Z axis, the longitudinal direction is taken as the X axis, and the lateral direction is taken as the Y axis. If the horizon is photographed when the optical axis is in the horizontal direction, a sky region exists above the horizon which vertically divides the photographed image into two, as shown in FIG. 10B. Therefore the image processor 16 can estimate a position of the horizon in the color image based on the attitude information of the imaging apparatus 3 when the color image is photographed, and the range of the sky region can be limited using this position.

In concrete terms, the image processor 16 can estimate the height above which the sky region exists in the image by rotating the optical axis direction around the Y axis (pitching) based on the horizontal position and detecting the angle θ which the optical axis direction vertically deviated from the horizontal position. FIG. 10C shows an example when the optical axis direction is rotated around the Y axis by the angle θ. The deviation amount d from the horizon in this image at this time is given by the following expression, where f denotes a focal length.

[Math. 3]

$$d = f \tan \theta \quad (3)$$

A number of pixels that vertically deviated from the horizon in this image can be calculated by dividing this value by the pixel size. The image processor 16 acquires the binary apparatus information sky map by setting the upper part from the deviated pixels as the sky region.

If the case of rotating around the Z axis (rolling) is also considered in addition to the rotation around the Y axis, the position of the horizon in the color image can be acquired more accurately. By performing a similar calculation as above, the position of the sky region in the image can be estimated and an apparatus-based sky map can be acquired. If the rotation around the Z axis is considered, the position of the sky region in the image can be estimated with considering the longitudinal photographing or the lateral photographing.

By using the apparatus-based sky map considering the imaging apparatus information like this, the sky region in the image can be estimated based on the attitude of the imaging apparatus, and an error of detecting a non-sky region as the sky region can be prevented. In a general photographing scene, a sky exists above the horizon because a mountain and a building exist, hence if a sky region is detected in a lower part of the screen by mistake, the detected region can be removed from the sky region by using the apparatus-based sky map, and a sufficient effect can be demonstrated in the sky region detection.

Besides acquiring the horizontal position, it is preferable to determine whether the photographing is indoors or outdoors based on the photographing time, exposure and color temperature. In the case of indoor photography, it is possible that sky does not exist in the photographed image. If the image is determined as an indoor photograph, a region of which brightness is higher than the average brightness of the image is detected, and the apparatus-based sky map is updated by setting the common region with the apparatus-based sky map generated by the gravity sensor 20, as the sky region.

Then in step S34, the image processor 16 integrates the color-based sky map Sc, the depth-based sky map Sd and the apparatus-based sky map. The image processor 16 first integrates the color-based sky map Sc and the depth-based sky map Sd in the same manner as the integration processing in Embodiment 1, and acquires a first provisional sky map having the same spatial resolution as the color-based sky map Sc. Then the image processor 16 integrates the color-based sky map and the apparatus-based sky map, and acquires a second provisional sky map where the error detection region existing in the lower part of the image is removed. Then the image processor 16 acquires an integrated sky map Si, in which the common region of the first provisional sky map and the second provisional sky map is detected as the sky region.

The sky map correction processing (step S35) is the same processing as step S24 of Embodiment 1, hence description thereof will be omitted.

In this embodiment, the apparatus-based sky map using the apparatus information is added, whereby even if a color of a region is similar to the sky region and reliability of the depth of this region is low, an error of detecting this region as the sky region can be prevented as long as this region is located lower than the estimated horizon.

(Embodiment 3)

Embodiment 3 will be described. A difference of Embodiment 3 from the other embodiments is that filter processing is used for correcting the sky map. The configuration of an imaging apparatus of Embodiment 3 is the same as that of Embodiment 1 or 2, therefore the same reference symbols are used for description here.

The processing in Embodiment 3 that is different from Embodiment 1 will now be described. In Embodiment 3, the flow of the sky region detection processing performed by the image processor 16 is basically the same as the flow chart according to Embodiment 1 shown in FIG. 3, but the sky map correction processing (S24) is different. Now the sky map correction processing according to Embodiment 3 will be described.

In this embodiment, the image processor 16 performs a processing using a known joint bilateral filter for the integrated sky map Si acquired by the integration processing in step S23 and the color image. The joint bilateral filter is given by the following expression.

[Math. 4]

$$JBF(M(u), I(u)) = \frac{1}{w_u} \sum_{u' \in R(u)} G_d(u - u') G_r(I(u) - I(u')) M(u') \quad (4)$$

An integrated sky map M(u) is used as a correction target image, and a color image I(u) is used as a reference image. In a local region R, the integrated sky map is filtered with adding a weight based on the Gaussian function Gd corresponding to the depth from a target pixel u on the image, and the Gaussian function Gr of which parameter is the depth based on the difference of the pixel values of the target pixel on the reference image. Wu is a normalization term. A color image is used for the reference image, and weight becomes heavier as the color is closer to the color of the target pixel. This filter processing is executed for all the pixels. The integrated sky map after the filter processing is executed for the binary integrated sky map is a multi-valued map. Therefore a threshold is set and binarization processing is performed, whereby a final sky map is generated.

It is also effective to perform the shape correction processing using a known guided filter. For the filter processing used for correcting the shape of the sky region according to this embodiment, it is preferable to use an edge preserving filter processing, but the filter processing method is not limited to this, and another filter processing may be used.

According to this embodiment, color information based on the color image is used, hence even if a sky region of which texture is mostly low, such as a cloudy sky, the shape of the sky region can be corrected since the color is similar to the peripheral sky region. As a result, the sky region can be accurately extracted when the sky region having high texture exists.

<Modification>

The above description of each embodiment is an example to assist in understanding the present invention, and the invention can be carried out by appropriately changing or combining the content of the above description within a scope of not departing from the spirit of the invention. For example, in the above example, the depth measuring apparatus photographs a color image and generates a depth image based on the photographed color image, but the present invention can also be carried out as an image processing apparatus which receives a color image and a depth image from an external source, and performs the image processing.

Here it is preferable that the color image and the depth image have the same view point and same angle of view, but this is not essential.

The present invention can also be carried out as an imaging apparatus that includes at least a part of the above mentioned processing, or as an image processing method, or as an image processing program causing an image processing apparatus to execute the image processing method. The above processing and units may be freely combined as long as no technical inconsistency is generated.

Each elemental technique described in each embodiment may be freely combined. Further, in the above example, the second provisional sky map is generated based on the depth values of the depth image, but it is not essential to generate the second provisional sky map. In other words, only candidates (regions) of which depth values of the corresponding depth image are longer than a predetermined depth (threshold), out of the candidates of the sky region in the first provisional sky map, may be determined as the sky regions of the integrated sky map.

<Application Examples>

The above mentioned image processing technique of the present invention can be ideally applied to an imaging apparatus, such as a digital camera and a digital camcorder, or an image processing apparatus, a computer or the like to perform image processing on image data acquired by the imaging apparatus. The present invention can also be applied to various electronic apparatuses that include the imaging apparatus or the image processing apparatus (e.g. portable phone, smartphone, slate terminal, personal computer).

In the description of the embodiments, the image processing functions are integrated into the imaging apparatus main body, but the image processing may be performed outside the imaging apparatus. For example, the image processing function may be integrated into a computer having an imaging apparatus, and the computer may acquire an image photographed by the imaging apparatus, and perform the image processing. Further, the image processing function may be integrated into a computer that can access a network by cable or wireless, and this computer may perform the image processing via this network.

The acquired sky region information can be used for various image processing, such as memory color correction, exposure correction, region division of an image, and depth information correction.

The image processing technique of the present invention can be installed in the apparatus by software (program) or by hardware. For example, the various processing to achieve the object of the present invention may be implemented by storing a program in a memory of a computer (e.g. microcomputer, FPGA) enclosed in the imaging apparatus or the image processing apparatus, causing the computer to execute this program. It is also preferable to create a dedicated processor, such as an ASIC, that implements all or a part of the processing of the present invention by logic circuits.

To achieve this object, the above mentioned program is provided to the computer via a network or various types of recording media that can be a storage apparatus (that is, computer readable recording media that hold data non-transitorily). Therefore the computer (including such a device as a CPU and MPU), the method, the program (including program codes and program products) and the computer readable medium that holds the program non-transitorily are all included within the scope of the present invention.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-029882, filed on Feb. 18, 2015, which is hereby incorporated by reference herein in its entirety.

What is claimed is:

1. An image processing apparatus for detecting a sky region based on a color image and a depth image, the image processing apparatus comprising:
 a processor and/or circuitry configured to function as:
 a first generator configured to generate a first provisional sky map based on pixel values of the color image;
 a second generator configured to generate a second provisional sky map based on the depth values of the depth image; and
 an integrator configured to generate a sky map by integrating the first provisional sky map and the second provisional sky map.

2. The image processing apparatus according to claim 1, wherein
 the first provisional sky map is a map that indicates whether each region of the color image is a candidate of the sky region, and
 the second provisional sky map is a map that indicates whether each region of the depth image is a candidate of the sky region.

3. The image processing apparatus according to claim 1, wherein
 the integrator generates the sky map by setting, as the candidate of the sky region, a region where an overlap between a region determined as the sky region in the first provisional sky map and a region determined as the sky region in the second provisional sky map has a predetermined ratio or more.

4. The image processing apparatus according to claim 3, wherein
the first generator generates the first provisional sky map based on the determination as to whether each sub-region created by dividing the color image into a plurality of regions is a sky region, and
when a predetermined ratio or more of a region in the second provisional sky map, which corresponds to a sub-region determined as the sky region in the first provisional sky map, is determined as the sky region, the integrator generates the sky map by setting this sub-region as the sky region.

5. The image processing apparatus according to claim 1, wherein
the first generator generates the first provisional sky map by setting, as the candidate of the sky region, a region where pixel values of the color image have a predetermined brightness or color.

6. The image processing apparatus according to claim 1, wherein
the second generator generates the second provisional sky map by setting, as the candidate of the sky region, at least one of a region of which dispersion of the depth values is a first threshold or more, a region that is indicated as outside a depth measurement range, and a region that is indicated as impossible to measure depth, in the depth image.

7. The image processing apparatus according to claim 1, wherein the processor and/or circuitry is further configured to function as a corrector configured to correct, using the color image, a shape of the sky map generated by the integrator.

8. The image processing apparatus according to claim 7, wherein
the corrector extracts a low texture region, which is a connected region having a texture amount of a second threshold or less, from the color image and sets, as the sky region, a low texture region in which an amount of overlap with the sky region determined by the integrator is a third threshold or more.

9. The image processing apparatus according to claim 8, wherein
the corrector calculates the texture amount as a value generated by normalizing a brightness variance or standard deviation from the color image, using the brightness.

10. The image processing apparatus according to claim 7, wherein
the corrector corrects a shape of the sky map by performing an edge-preserving filtering using the sky region acquired by the integrator and the color image.

11. The image processing apparatus according to claim 7, wherein the processor and/or circuitry is further configured to function as a depth image corrector configured to correct a depth of the sky region in the depth image using the sky map of which shape has been corrected by the corrector.

12. A depth measuring apparatus, comprising:
an imaging unit configured to photograph a color image;
a depth image acquirer configured to acquire a depth image from the color image; and
the image processing apparatus according to claim 11.

13. The image processing apparatus according to claim 1, wherein
the integrator estimates a position of a horizon in the color image based on attitude information of an imaging apparatus when the color image is photographed, and determines the sky region considering the position of the horizon as well.

14. An imaging apparatus, comprising:
an imaging unit configured to photograph a color image; and,
the image processing apparatus according to claim 1.

15. An image processing method for detecting a sky region based on a color image and a depth image, the image processing method comprising:
a first generation step of generating a first provisional sky map based on pixel values of the color image;
a second generation step of generating a second provisional sky map based on the depth values of the depth image; and
an integration step of generating a sky map by integrating the first provisional sky map and the second provisional sky map.

16. A non-transitory computer readable medium storing a program causing a computer to execute an image processing method for detecting a sky region based on a color image and a depth image, the image processing method comprising:
a first generation step of generating a first provisional sky map based on pixel values of the color image;
a second generation step of generating a second provisional sky map based on the depth values of the depth image; and
an integration step of generating a sky map by integrating the first provisional sky map and the second provisional sky map.

* * * * *